United States Patent
Agrawal et al.

(10) Patent No.: US 11,252,183 B1
(45) Date of Patent: Feb. 15, 2022

(54) SYSTEM AND METHOD FOR RANSOMWARE LATERAL MOVEMENT PROTECTION IN ON-PREM AND CLOUD DATA CENTER ENVIRONMENTS

(71) Applicant: Airgap Networks Inc., Santa Clara, CA (US)

(72) Inventors: Ritesh R. Agrawal, San Jose, CA (US); Vinay Adavi, Sunnyvale, CA (US); Satish M. Mohan, San Jose, CA (US)

(73) Assignee: AIRGAP NETWORKS INC., Santa Clara, CA (US)

( * ) Notice: Subject to any disclaimer, the term of this patent is extended or adjusted under 35 U.S.C. 154(b) by 0 days.

(21) Appl. No.: 17/497,765

(22) Filed: Oct. 8, 2021

Related U.S. Application Data

(63) Continuation-in-part of application No. 17/387,615, filed on Jul. 28, 2021, and a continuation-in-part of application No. 17/357,757, filed on Jun. 24, 2021, now Pat. No. 11,171,985.

(51) Int. Cl.
 *H04L 29/06* (2006.01)
(52) U.S. Cl.
 CPC ........ *H04L 63/145* (2013.01); *H04L 63/0281* (2013.01); *H04L 63/1416* (2013.01)
(58) Field of Classification Search
 CPC ............. H04L 63/1466; H04L 12/4641; H04L 63/1416
See application file for complete search history.

(56) References Cited

U.S. PATENT DOCUMENTS

| | | | |
|---|---|---|---|
| 6,914,905 B1 * | 7/2005 | Yip | H04L 12/4641 370/395.53 |
| 8,055,800 B1 | 11/2011 | Bardzil et al. | |
| 9,306,965 B1 | 4/2016 | Grossman et al. | |
| 9,602,529 B2 * | 3/2017 | Jones | G06F 21/577 |
| 10,454,950 B1 | 10/2019 | Aziz | |
| 11,030,311 B1 | 6/2021 | Lopez | |
| 11,093,139 B1 * | 8/2021 | Karr | G06F 3/0689 |
| 2016/0323318 A1 | 11/2016 | Terrill et al. | |
| 2017/0149775 A1 | 5/2017 | Bachar et al. | |
| 2019/0312836 A1 | 10/2019 | Phillips | |
| 2020/0145416 A1 | 5/2020 | Mitzimberg | |
| 2020/0356664 A1 | 11/2020 | Maor | |
| 2021/0152595 A1 * | 5/2021 | Hansen | H04L 9/0894 |

OTHER PUBLICATIONS

Thapa, Manish, "Mitigating Threats in IoT Network Using Device Isolation", Master's Thesis, Feb. 4, 2018, 73 pgs.
International Search Report and Written Opinion for PCT/US2020/020593, dated Apr. 15, 2020, 8 pgs.
International Preliminary Report on Patentability for PCT/US2020/020593, Completed May 18, 2021, 8 pgs.

* cited by examiner

*Primary Examiner* — Arvin Eskandarnia
(74) *Attorney, Agent, or Firm* — Patent Law Works LLP

(57) ABSTRACT

A technique to stop lateral movement of ransomware between endpoints in a VLAN is disclosed. The security appliance may be implemented on-prem or in cloud data center environments. A security appliance is set as the default gateway for intra-LAN communication. Message traffic from compromised endpoints is detected. Attributes of ransomware may be detected in the message traffic, as well as attempts to circumvent the security appliance. Compromised devices may be quarantined.

26 Claims, 11 Drawing Sheets

```
root@ip-10-235-235-7:/home/ubuntu$ ip route show
default via 10.235.235.1 dev eth0 proto dhcp src 10.235.235.7 metric 100
10.235.235.0/28 dev eth0 proto kernel scope link src 10.235.235.7
10.235.235.1 dev eth0 proto dhcp scope link src 10.235.235.7 metric 100 root@ip-10-235-235-7:/home/ubuntu$ ip route del 10.235.235.0/28 dev eth0 root@ip-10-235-235-7:/home/ubuntu$ ip route show
default via 10.235.235.1 dev eth0 proto dhcp src 10.235.235.7 metric 100
10.235.235.1 dev eth0 proto dhcp scope link src 10.235.235.7 metric 100
```

SYSTEM AND METHOD FOR RANSOMWARE LATERAL MOVEMENT PROTECTION IN ON-PREM AND CLOUD DATA CENTER ENVIRONMENTS

CROSS REFERENCE TO RELATED APPLICATIONS

This application is a continuation of U.S. patent application Ser. No. 17/357,757, filed Jun. 24, 2021, entitled "System and Method to Detect Lateral Movement of Ransomware by Deploying a Security Appliance Over a Shared Network to Implement a Default Gateway with Point-To-Point Links Between Endpoints" and a continuation of U.S. patent application Ser. No. 17/387,615, filed Jul. 28, 2021, entitled "System and Method for Determining Endpoint Compatibility with Subnet Prefix of All-Ones for Lateral Propagation Prevention of Ransomware", which are hereby incorporated by reference in their entirety.

FIELD OF THE INVENTION

The present disclosure generally relates to techniques for ransomware protection. More particularly, the present disclosure is related to providing lateral movement protection from Ransomware in environments such as shared VLAN environments.

BACKGROUND

Ransomware is one of the biggest threats facing the security industry today. Ransomware is a form of malware that infects computer systems. Ransomware is becoming an increasing problem in the computer/network security industry. Ransomware infects a computer system and encrypts files. A ransom is demanded in exchange for a decryption key.

Conventional enterprise security solutions have proved to be inadequate in view of the high profile ransomware cases of large companies such as the Colonial Pipeline ransomware attack in 2021. The inadequacy of conventional enterprise security solutions is also evidenced by the fact that in 2020 51% of surveyed companies were hit by ransomware attacks.

Firewalls provide inadequate protection against ransomware attacks. In some companies, separate Virtual Local Area Networks (VLANs) are used to segment sections of a company by division as an additional layer of protection. For example, a finance department may have a separate VLAN domain than an engineering department. Or a finance department may have a different VLAN domain than a marketing department. However, this sort of segmentation of VLAN domains by departments doesn't address the problem of lateral movement of Ransomware attacks within a VLAN domain.

One of the reasons for the inadequacy of current enterprise security solutions is the difficulty of protecting against ransomware attacks within a shared VLAN based network architecture. If a device that is part of a shared VLAN broadcast domain is infected by ransomware or malware, there are very few security controls that can be implemented to prevent lateral propagation of the ransomware within the same VLAN network.

Referring to FIG. 1, a firewall 110 provides some limited protection against external ransomware attacks. However, a VLAN network also has east-west communication between endpoint devices 120 in a shared VLAN domain that is forwarded directly by the network router/switch 140. This east-west Intra-LAN communication is not visible to the network firewall 110 deployed up-stream on the network as shown in FIG. 1.

Current security solutions for lateral propagation protection of ransomware are based on endpoint protection. The drawback of these approaches is that it relies on an agent deployed on each endpoint to detect malicious ransomware processes being launched. Deploying and managing these agents is a challenge for IT organizations, and furthermore they cannot be deployed on IoT devices (such as web cameras, printers, and other devices) and are frequently not supported on older versions of operating systems.

Conventional VLAN network architectures have a potential gap in protection associated with lateral movement of ransomware between endpoint devices. Software application on endpoint devices provides only limited protection due to a variety of practical problems in managing software apps on endpoint devices and the presence of other IoT devices at endpoint devices, such as web cameras, printers, etc. There is thus a potential for ransomware to enter the VLAN network and laterally propagate to endpoint devices.

SUMMARY

A technique to detect lateral propagation of ransomware between endpoints in a VLAN is disclosed. Security appliances may be arranged in a load balanced configuration. Message traffic from compromised endpoints is detected. Additional measures may also be taken to generate alerts or quarantine compromised end point devices. The load-balances security appliances monitors intra-VLAN communication between the plurality of endpoint devices of the shared VLAN environment. The security appliance detects lateral propagation of ransomware between endpoint devices via intra-VLAN communication in the shared VLAN environment.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 10 illustrates code for configuring security appliances in accordance with an implementation.

DETAILED DESCRIPTION

Figure 1:
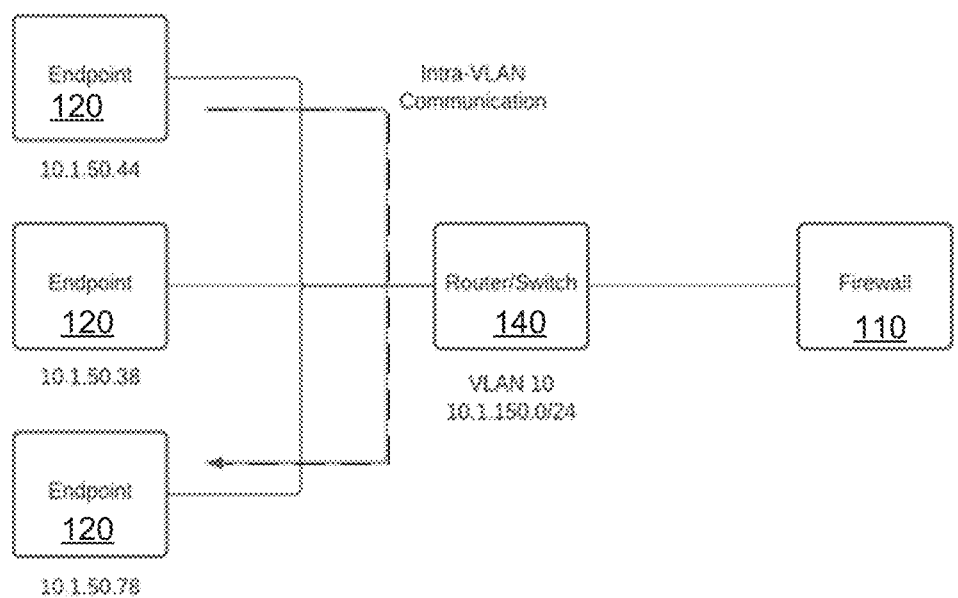
FIG. 1 is a block diagram illustrating Intra-LAN traffic in a conventional VLAN network.
Figure 2:
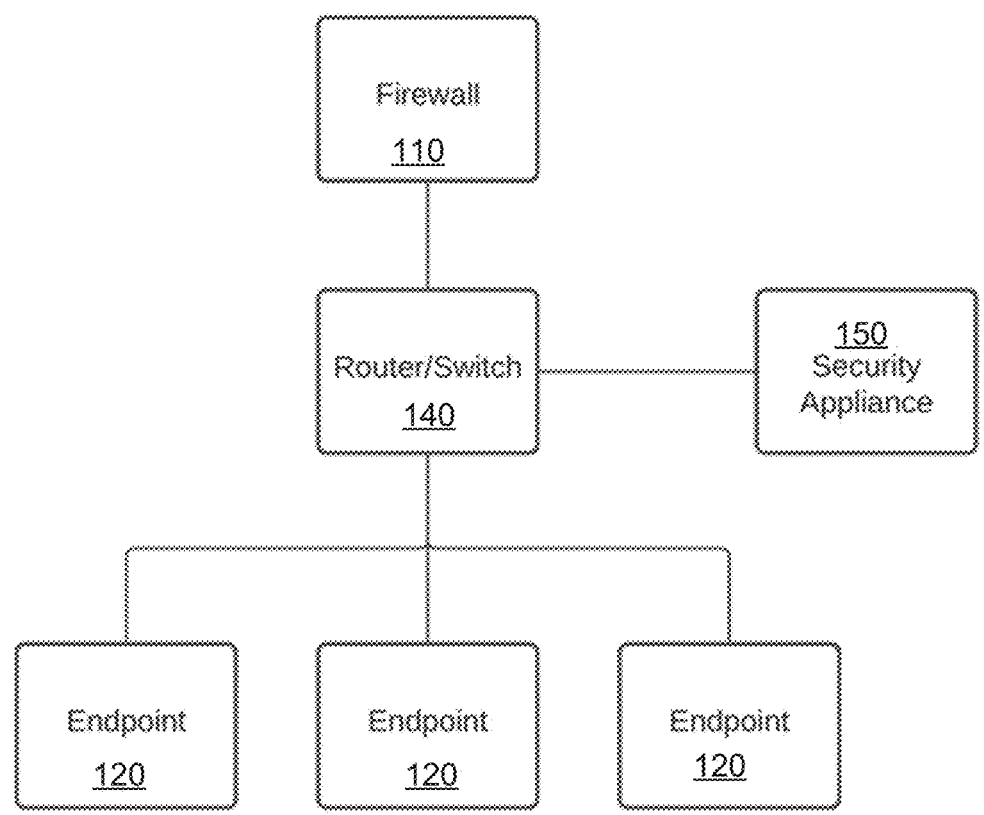
FIG. 2 is a block diagram illustrating a security appliance to provide protection from lateral movement of ransomware in accordance with an implementation.

FIG. 2 is a diagram illustrating a change to a network architecture to prevent lateral propagation of malware and ransomware. The operation of the network router/switch 140 is augmented and enhanced with a security appliance 150. The security appliance could be implemented in a variety of ways, such as using a mixture of hardware and software, firmware, etc. However, in one implementation it is implemented as software that may, for example, be stored on a memory and executed on a computer processor associated with a computing device such as the router/switch. In one implementation, it may be deployed on an existing port (e.g., an access port or a trunk port) of the VLAN network. As an illustrative example, the security appliance 150 may be implemented as software compatible with a virtual machine (VM) implementation, such as within a hypervisor implementation in VMware®. The security appliance may be deployed on a port that allows the security appliance to monitor and control the flow of message traffic across a network node for a plurality of endpoint devices with an individual VLAN domain or even across multiple VLAN domains. Deploying the security appliance on a trunk port is advantageous because a trunk port is a specific type of port on a network switch that allows data to flow across a network node for multiple virtual local area networks or VLANs. However, the security appliance could alternatively be deployed on an access port.

In one implementation, virtual point to point links between a security appliance 150 and each endpoint 120 are established in a shared VLAN domain that forces all traffic from an endpoint to traverse the security appliance 150. In one implementation, the security appliance is deployed on an access port or a trunk port on an existing router or switch.

In one implementation, the security appliance 150 becomes the default gateway and the Dynamic Host Configuration Protocol (DHCP) server responsible for dynamically assigning an IP address and other network configuration parameters to each endpoint device on the network so that they communicate with each other in the existing VLAN network.

When an individual endpoint 120 requests an IP address, the security appliance 150 responds back with an IP address and a subnet mask that sets the security appliance as the default gateway for the endpoint. In one implementation, the security appliance responds with a subnet comprised of all-ones—255.255.255.255—that sets itself as the default gateway for the endpoint. Since the endpoint receives an IP address with a subnet mask of 255.255.255.255, any network communication with other endpoints or internet applications needs to be routed via the default gateway. In other words, a network with a subnet mask of 255.255.255.255 puts each device inside its own subnet, which forces them to communicate with the default gateway before communicating with any other device. The 255.255.255.255 subnet mask may also be referred to by the Classless Inter-Domain Routing (CIDR) prefix/32, which has 1 IP address. The CIDR number comes from the number of ones in the subnet mask when converted to binary. The 255.255.255.255 subnet mask corresponds to a CIDR prefix of/32.

Since the security appliance 150 sets itself as the default gateway for the network (by virtue of the subnet mask being comprised of all-ones), any East-West communication between different endpoints 120 and communication between an endpoint 120 and other endpoints 120 or applications on different networks will be routed via it. This provides the security appliance with the unique ability to allow only authorized communication and disallow everything else.

Figure 3:
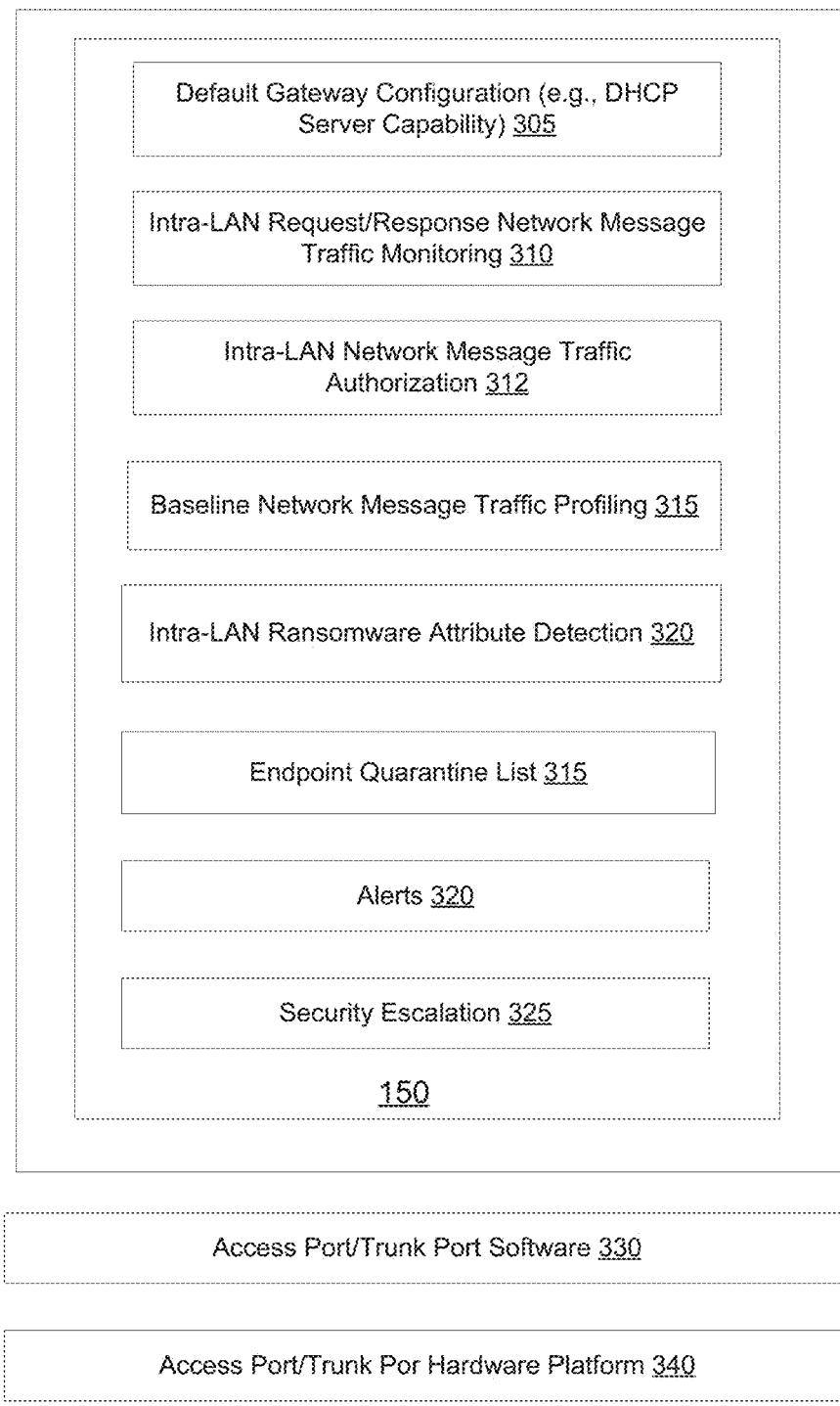
FIG. 3 is a block diagram illustrating components of a security appliance in accordance with an implementation.

FIG. 3 is a high-level diagram illustrating major functional blocks of the security appliance in one implementation. As previously discussed, the security appliance 150 may be deployed in an access port or in a trunk port associated with VLANs for a number of different endpoint devices (e.g., different laptop computers in a VLAN domain). It thus may by implemented as software stored on a computer memory and executable by a processor associated with an access port or a trunk port. For example, it may be implemented as software deployed with the software 330 and hardware 340 environment associated with an access port or a trunk port. In the example of FIG. 3, the security appliance 150 includes a default gateway configuration unit 305 to set the security appliance as a default gateway as described above (e.g., using a subnet mask of 255.255.255.255). An intra-LAN traffic monitoring unit 310 monitors intra-LAN traffic. This can include monitoring both request and response messages in intra-LAN traffic and detecting irregularities in intra-LAN request/response message traffic. An Intra-LAN network message traffic authorization unit 312 allows only authorized communication between the plurality of endpoint devices of the shared VLAN environment. For example, it may block unauthorized communication between endpoints. A baseline traffic profiling unit 315 may be optionally included to develop a baseline profile for typical or normal intra-LAN message traffic patterns between endpoint device 120. For example, the presence of ransomware may generate unusual amounts or types of traffic in comparison to a baseline profile. An Intra-LAN ransomware attribute detection unit 320 determines if one or more intra-LAN messages have computer code indicative of ransomware, such as computer code files to implement file scanning and encryption.

In the example of FIG. 3, the security appliance includes an endpoint quarantine unit 315 to quarantine compromised endpoints. This may include, for example, generating a list of quarantined endpoint devices that are used to block intra-LAN communication for compromised devices (i.e., to stop the lateral movement of ransomware). An alert unit 320 may be included to generate automated alerts, such as generating alerts for an administrator of an attempted ransomware attack. An optional security escalation unit 325 may be included to implement a security escalation protocol to increase security.

It will be understood that while the security appliance 150 may be deployed on an existing VLAN system, in some implementations it may also be incorporated into new VLAN system components, such as being incorporated into an access port or a trunk port.

Figure 4:
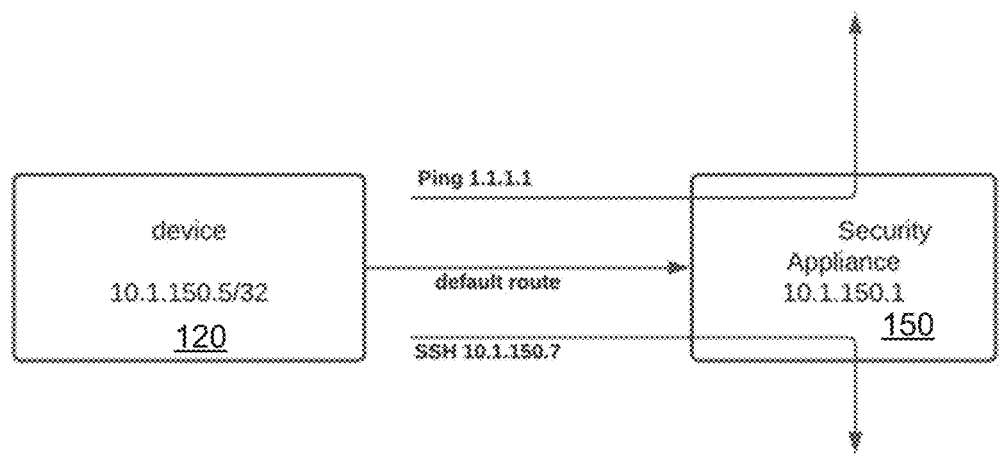
FIG. 4 illustrates the security appliance set as the default gateway in accordance with an implementation.

From the perspective of the endpoint 120, other endpoints and applications appear to be in a different IP network. Hence all outbound packets are sent to the default gateway as shown in FIG. 4. In this example, a /32 subnet is illustrated. However, more generally, a /31 or a /30 subnet may be used. Configuring a /32 subnet mask on endpoints forces all outbound network traffic via the security appliance 150. The security appliance 150 allows only authorized communication between endpoints, thereby significantly reducing the attack surface and lateral propagation by malware and ransomware. Detecting attempts by malicious actors to circumvent the protection provided by the security appliance permits quarantining devices which attempt to do so. Rapid quarantining of compromised endpoint devices stops the lateral propagation of ransomware. This, in turn, reduces the spread and potential damage of a ransomware attack.

Figure 5:
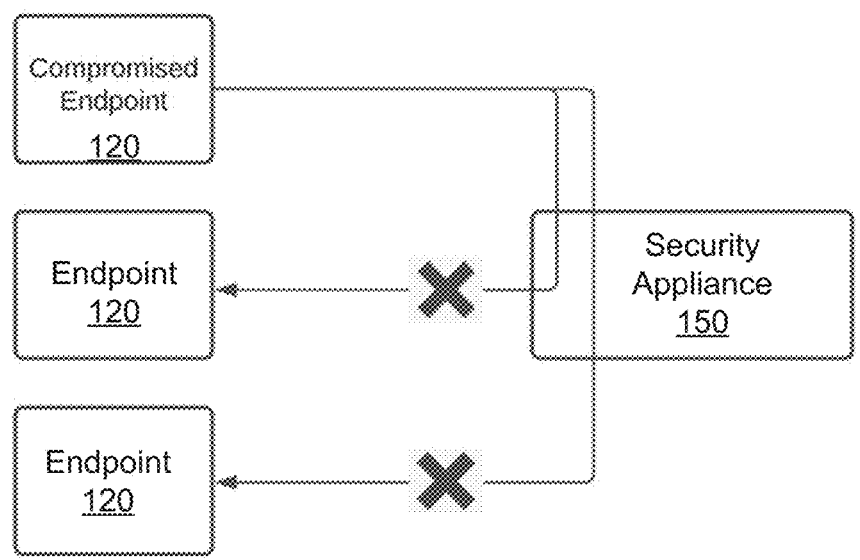
FIG. 5 illustrates how a security appliance may quarantine a compromised endpoint in accordance with an implementation.

FIG. 5 is a high-level block diagram illustrating an example of how lateral propagation of ransomware is prevented in accordance with an implementation. In this example, a compromised endpoint is infected with ransomware. The ransomware may, for example, have entered the compromised endpoint in a variety of different ways, such as through a peripheral IoT device in communication with the compromised endpoint.

Regardless of how the compromised endpoint became infected with ransomware, the security appliance 150 was earlier set as the default gateway. The security appliance 150 monitors message traffic and quarantines suspicious traffic from the compromised endpoint to other endpoints. This may include, for example, detecting message traffic that has attributes associated with ransomware, such as computer code for file scanning or encryption. It may also optionally include, in some implementations, detecting that message traffic that is unusual in comparison to a baseline profile of normal message traffic.

It is possible that ransomware in a compromised endpoint may attempt to directly communicate with another endpoint and bypass the security appliance 150. However, such an attempt to circumvent the security appliance 150 may still be detected and prevented.

Figure 6:
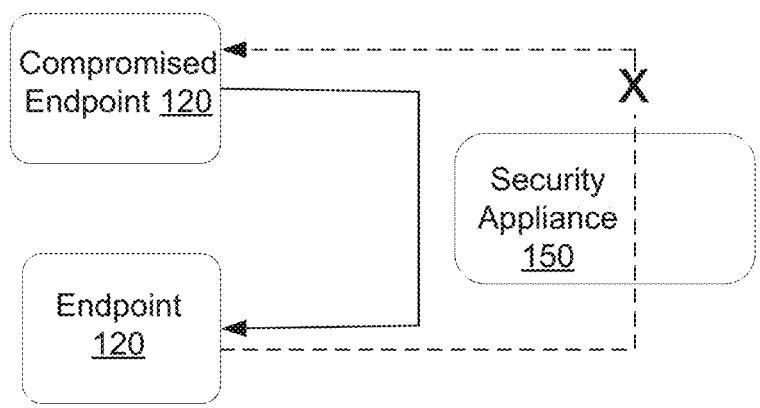
FIG. 6 illustrates how the security appliance may detect compromised endpoints attempting to circumvent the security appliance in accordance with an implementation.

FIG. 6 illustrates an example of how attempts to circumvent protection are detected. A compromised endpoint might, for example, have code in the ransomware that attempts to directly send request messages to another endpoint, bypassing the security appliance 150. However, an uncompromised endpoint will attempt to send its response message to the security appliance 150 as the default gateway. The security appliance 150 determines when it has detected a response from an endpoint directed to another endpoint but for which it has not detected a corresponding request. This discrepancy (a response message but no request message) may be used to identify that a compromised endpoint is attempting to circumvent the protection of the security appliance 150.

Figure 7:
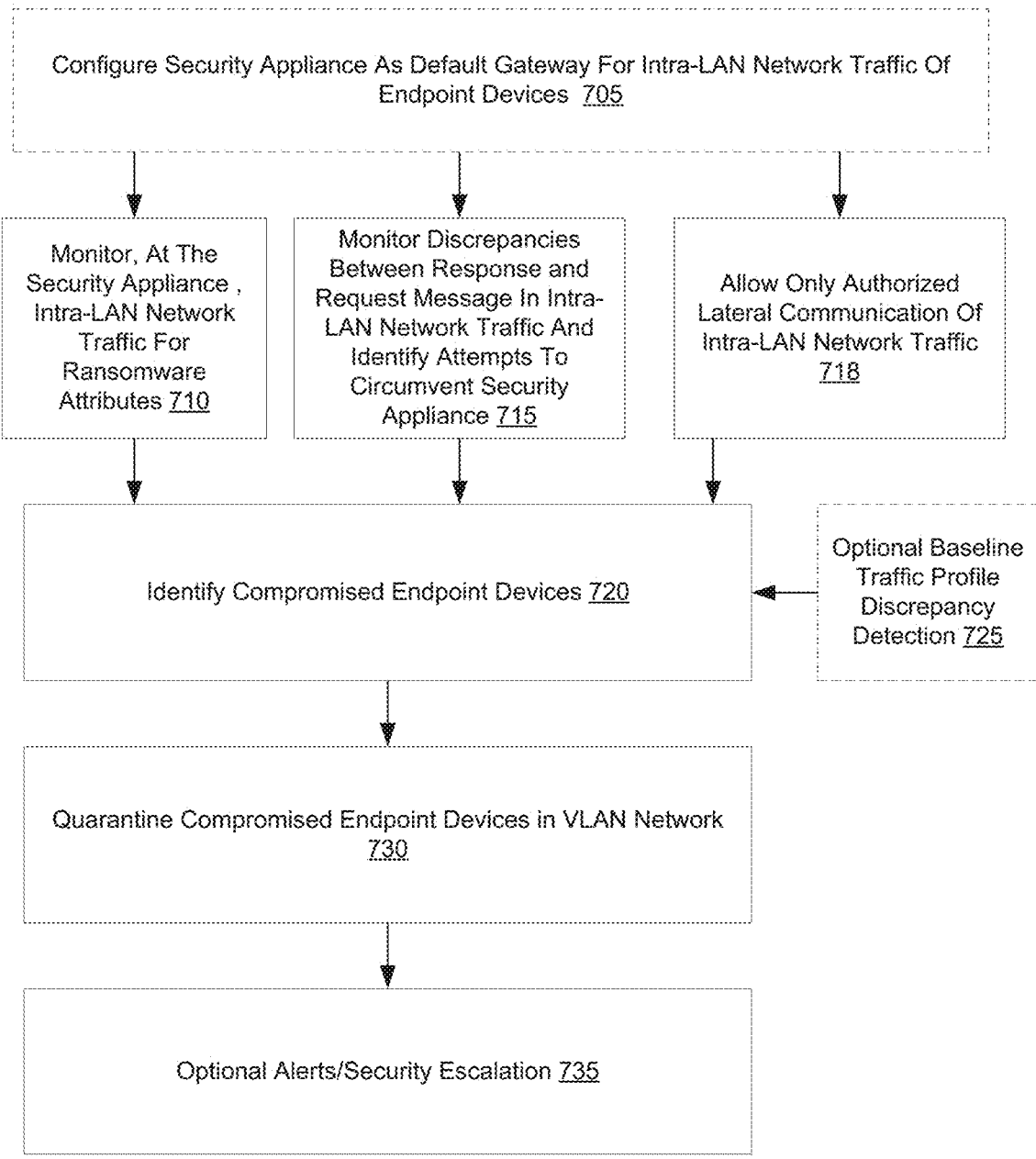
FIG. 7 is a flow chart of an example method for ransomware protection in accordance with an implementation.

FIG. 7 is a flow diagram of a method in accordance with an implementation. In block 705, a security appliance is configured as the default gateway for Intra-LAN network traffic of endpoint device. In block 710, the security appliance monitors intra-LAN network traffic for ransomware attributes. In block 715, the security appliance also monitors the intra-LAN message traffic for discrepancies between response and request messages in intra-LAN network traffic and identify attempts to circumvent the security appliance. In block 718, the method also includes the security appliance allowing only authorized lateral communication of Intra-LAN network traffic. In block 720, compromised endpoint devices are identified based on the outputs of blocks 710 and 715. Optionally, discrepancies with respect to a baseline message traffic profile from block 725 may be considered as an additional factor. In block 730, compromised endpoint devices are quarantined. This may include, for example, placing them on a list of quarantined devices, blocking communication with them, or taking other measures to isolate them. In block 735 optional alerts or security escalation may be performed. Security escalation could, for example, include implementing a security protocol to take a further action to mitigate or minimize the risk of further damage from a ransomware attack.

The security appliance 150 restricts communication in a manner that significantly reduces the attack surface available to the ransomware to exploit vulnerabilities in other endpoints and/or applications and propagate laterally. It detects attempts to circumvent the protection provided by the security appliance. If a compromised endpoint attempts to bypass the default gateway and tries to laterally propagate to another device, this attempt would be detected by the security appliance and appropriate action would be taken. This detection is because the uncompromised endpoint would still send the response packets to the compromised endpoint via the security appliance 150 (due to the /32 default route). The security appliance 150 detects the fact that it has seen a response packet to a request sent by the compromised endpoint, and it alerts the operator in this case. Automatic actions may be taken by the security appliance 150 including quarantining the compromised endpoint so that further lateral propagation is impossible.

On Prem and Cloud Data Center Implementations

As previously discussed, a security appliance may be used to protect device endpoints on a shared VLAN network from lateral propagation of malware and ransomware. However, in some implementations the security appliance 150 may be implemented in different ways including On Prem and Cloud based data center environments as well. For example, frequently DevOps teams deploy workloads in Cloud provider based virtual networks (VPCs or Virtual Private Networks) and open security group rules to allow different cloud application tiers to communicate with each other. This results in loss of control and visibility by SecOps and Security teams frequently leading to ransomware attacks and lateral propagation.

On Prem and Cloud based data center environment may use different techniques than those previously describe to set the security appliance as a default gateway.

On-Prem Deployment

Figure 8:
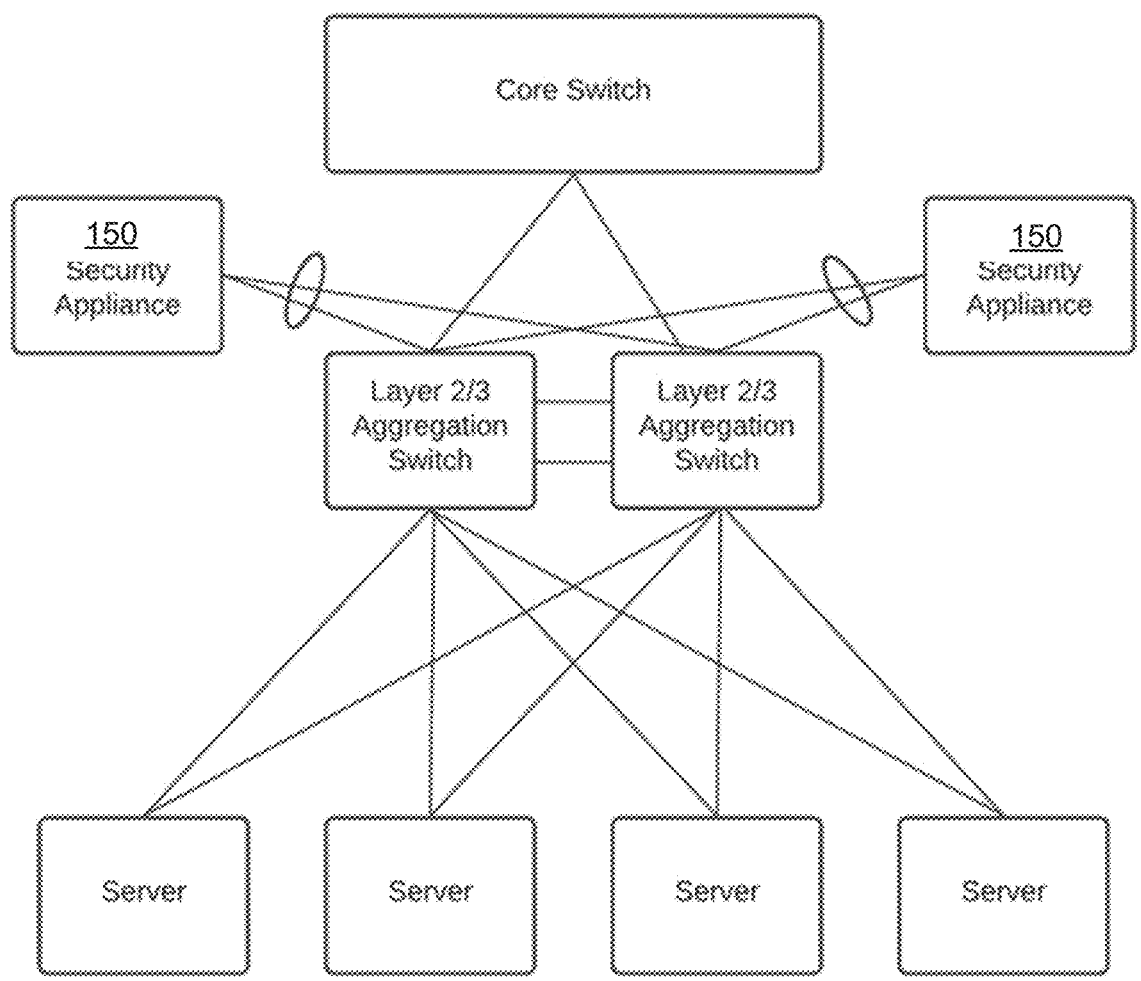
FIG. 8 illustrates an implementation of a load balanced implementation of security appliances in a data center in accordance with an implementation.

FIG. 8 illustrates an example of a deployment architecture for an on-prem data center environment. Typical data center topologies are comprised of Layer 2/Layer 3 aggregation switches being deployed in Active-Active topologies for load balancing. These switches are then connected to the core switch.

The security appliances 150 are deployed in a high availability configuration. each of the security appliances are deployed on bonded trunk ports connected to both aggregation switches for high availability. The existing SVI (switched virtual interface) on the aggregation switches are un-configured and the security appliances assume the role of the default gateway for the existing VLAN networks.

While two aggregation switches and two security appliances are illustrated, more generally this could be implemented with more than two aggregation switches and more than two security appliances. That is, there may be a set of at least two aggregation switches and at least a corresponding number of security appliances as part of a high availability configuration.

Once the VLAN traffic is forced to the high availability security appliances, the security appliances may perform any of the previously described protection mechanisms to monitor VLAN traffic, detect lateral propagation of malware or ransomware, and take actions such as quarantining ransomware and generating alerts.

Cloud VPC Deployment

When deployed within cloud provider virtual private cloud (VPC) networks the security appliance 150 may either be deployed individually within every VPC. Alternatively, a single (pair) of appliances may be deployed in a transit VPC which is shared between multiple VPCs.

Figure 9:
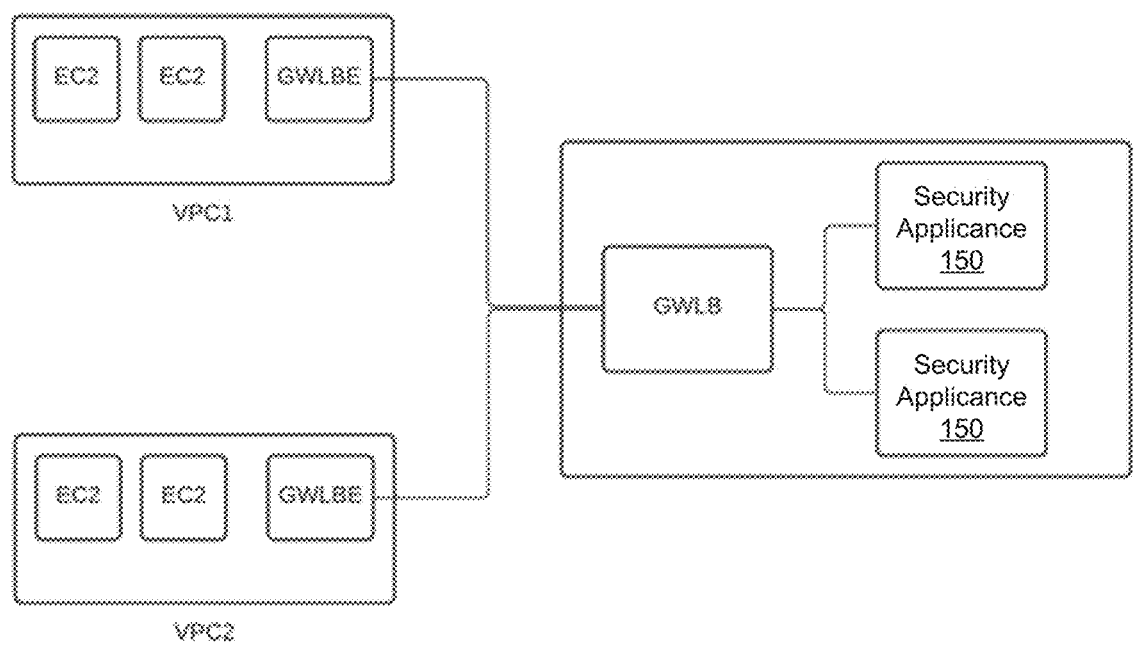
FIG. 9 illustrates a load balance implementation of security appliances for virtual private cloud implementation in accordance with an implementation.

Amazon Web Services (AWS) has offered a construct called the Gateway Load Balancer (GWLB). This permits the security appliance to be deployed on a shared VPC as shown in the example in FIG. 9. Each VPC may include one or more Elastic Compute Cloud (EC2). Traffic from individual VPCs is routed via Gateway Load Balancer Endpoints (GWLBE) to the security appliances behind a GWLB.

Local Route Deletion

To cause all network traffic between servers in the same VLAN to be routed via the default gateway based on the security appliances, various techniques may be used. In one example of a deployment, the network operator unconfigures a default link local route on each server within the data center. This route is used by the operating system to route traffic within the local IP subnet/VLAN.

In the example shown in FIG. 10, the link local route pointing to the network 10.235.235.0/28 would be deleted on all the servers within this VLAN (this may be achieved using an automation script pushed by the network operator to all the servers). The security appliance would then be configured as the default gateway (10.235.235.1 in the above example, where 10.235.235.1 corresponds to an internal private IP address usually used as a default gateway) for each of the VLAN networks which are part of the Airgap protection.

Figure 11:
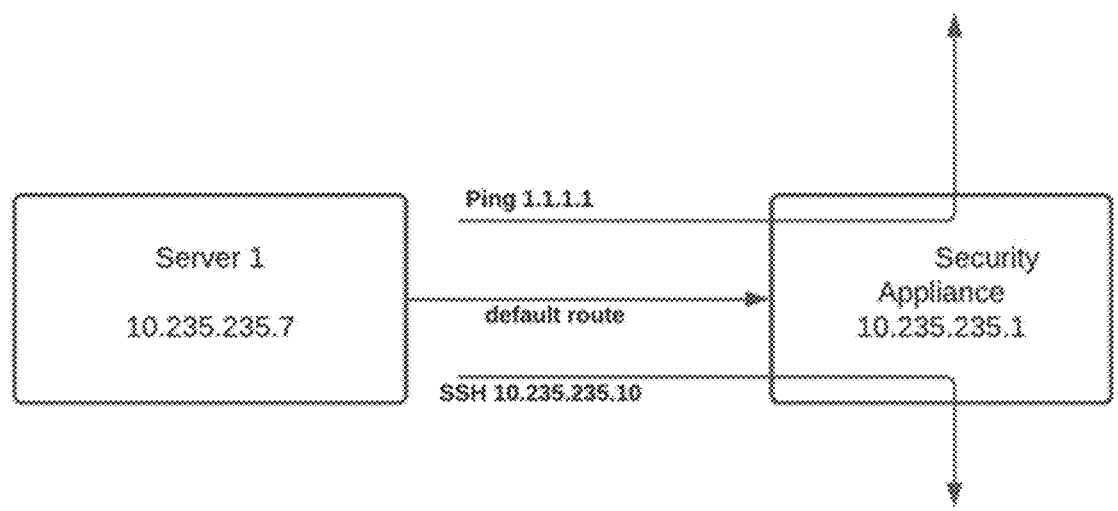
FIG. 11 illustrates routing of message traffic in accordance with an implementation.

As a result of making this change, all outbound packets from a given server to other servers in the same VLAN or to other servers/applications on other VLANs/Internet would be sent to the default gateway (which is the security appliance with IP address 10.235.235.1) as shown in FIG. 11. FIG. 11 shows a default route from a server to the security appliance, a ping 1.1.1.1, and an SSH server address 10.235.235.10. That is, the security appliance is the default gateway for packets from a given server to other servers in the same VLAN.

This network arrangement where all outbound traffic from each server is routed via the security appliance provides it the unique ability to allow only authorized communications and disallow everything else.

It will be understood from the previous discussion that the default link local route can be deleted and the system default route (for on-prem data center servers) takes precedence to route all link local traffic to the security appliance configured as default gateway. The default link local route can be deleted and the VPC default route for Cloud Virtual Private Networks takes precedence to route all link local traffic to the security appliance configured as default gateway. In other words, deleting the link local route to permit all link local traffic would be routed to the security appliance configured as default gateway.

On-Prem and Cloud Data Center Environment Security Functions

The security function performed by the security appliance for on-prem and Cloud data center environment implementation may be similar to those previous described in regards to detecting lateral propagation of ransomware, blocking lateral propagation of ransomware, etc.

Alternate Embodiments

Other implementations of one or more of these aspects include corresponding systems, apparatus, and computer programs, configured to perform the actions of the methods, encoded on computer storage devices.

These and other implementations may each optionally include one or more of the following features.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method of high availability ransomware protection in a Virtual Local Area Network (VLAN) of a data center, comprising:
   configuring at least two security appliances to operate as a high availability default gateway for VLAN communication associated with servers associated with a VLAN;
   monitoring, by the at least two security appliances, intra-VLAN communication between a plurality of endpoint devices of at least one shared VLAN environment; and
   detecting, by the at least two security appliances, lateral propagation of ransomware between endpoint devices via intra-VLAN communication.

2. The method of claim 1, wherein the at least two security appliances are deployed in a data center topology having a set of Layer 2/Layer 3 aggregation switches deployed in active-active topologies for load balancing, with the at least two security appliances deployed on bonded trunk portions of the set of Layer 2/Layer 3 aggregation switches for high availability.

3. The method of claim 1, wherein the at least two security appliances are deployed in shared virtual private clouds.

4. The method of claim 3, wherein a default link local route is unconfigured and the at least two security appliances are configured as the default gateway.

5. The method of claim 4, wherein the default link local route is deleted and a system default route, for on-prem data center servers, takes precedence to route all link local traffic to the load balanced security appliances configured as the default gateway.

6. The method of claim 4, wherein the default link local route is deleted, and a virtual private cloud default route for Cloud virtual private networks takes precedence to route all link local traffic to the at least two security appliances configured as the default gateway.

7. The method of claim 4, wherein the default link local layer is deleted and link local traffic is routed to the load balanced security appliances configured as the default gateway.

8. A computer-implemented method of high availability ransomware protection in a Virtual Local Area Network (VLAN), comprising:
   configuring at least two security appliances as a high availability default gateway in a data center topology having at least two Layer 2/Layer 3 aggregation switches deployed in Active-Active load balancing topology coupling a core switch to a plurality of servers;
   the at least two security appliances coupling each respective security appliance to bonded trunk ports of each Layer 2/Layer 3 aggregation switches for high availability with the configuring including adjusting a switched virtual interface for the at least two Layer2/Layer 3 aggregation switches to change the initial configuration to a configuration in which the at least two security appliances assume the role as the default gateway for VLAN networks,
   the configuring including deleting a default link local layer and routing link local traffic to the load balanced security appliances configured as the high availability default gateway;

monitoring, by the at least two security appliances, intra-VLAN communication between a plurality of endpoint devices of at least one shared VLAN environment; and detecting, by the at least two security appliances, lateral propagation of ransomware between endpoint devices via intra-VLAN communication.

9. The computer-implemented method of claim 8, further comprising: allowing, by the at least two security appliances, only authorized communication between the plurality of endpoint devices of the shared VLAN environment.

10. The computer-implemented method of claim 9, wherein the at least two security appliances block unauthorized communication between the plurality of endpoint devices of the shared VLAN environment.

11. The computer-implemented method of claim 8, further comprising: quarantining an endpoint device compromised by ransomware.

12. The computer-implemented method of claim 8, wherein the detection comprises detecting a message attribute of a message originating from an endpoint device indicative of ransomware.

13. The computer-implemented method of claim 12, wherein the message attribute comprises file scanning code or file encryption code.

14. The computer-implemented method of claim 12, wherein the detection comprises detecting an attribute of message traffic, relative to a baseline profile of message traffic, indicative of an attempt to laterally propagate ransomware.

15. The computer-implemented method of claim 8, wherein the detection comprises:

detecting a response message from a first endpoint device to a second endpoint device not having a corresponding request message from the second endpoint device pass through the security appliance.

16. The computer-implemented method of claim 8, further comprising generating an alert in response to detecting an attempt of a compromised endpoint device to laterally propagate ransomware via intra-VLAN communication.

17. A computer-implemented method of high availability ransomware protection in a Virtual Local Area Network (VLAN) implemented using security appliances implemented in a cloud data center environment, comprising:

configuring at least one security appliance, in a virtual private cloud as a default gateway, including by deleting a default link local route and link local traffic is routed to the at least one security appliance;

monitoring, by the at least one security appliance, intra-VLAN communication between a plurality of endpoint devices a shared VLAN environment; and detecting, by the at least one security appliance, lateral propagation of ransomware between endpoint devices via intra-VLAN communication.

18. The computer implemented method of claim 17, wherein the at least one security appliance comprises two security appliances configured in a load balanced configuration to service at least one virtual private cloud.

19. The computer-implemented method of claim 18, further comprising: quarantining an endpoint device compromised by ransomware.

20. The computer-implemented method of claim 17, further comprising: allowing, by the at least one security appliance, only authorized communication between the plurality of endpoint devices of the shared VLAN environment.

21. The computer-implemented method of claim 17, wherein the at least one security appliance blocks unauthorized communication between the plurality of endpoint devices of the shared VLAN environment.

22. The computer-implemented method of claim 17, wherein the detection comprises detecting a message attribute of a message originating from an endpoint device indicative of ransomware.

23. The computer-implemented method of claim 22, wherein the message attribute comprises file scanning code or file encryption code.

24. The computer-implemented method of claim 22, wherein the detection comprises detecting an attribute of message traffic, relative to a baseline profile of message traffic, indicative of an attempt to laterally propagate ransomware.

25. The computer-implemented method of claim 22, wherein the detection comprises: detecting a response message from a first endpoint device to a second endpoint device not having a corresponding request message from the second endpoint device pass through the at least one security appliance.

26. The computer-implemented method of claim 17, further comprising generating an alert in response to detecting an attempt of a compromised endpoint device to laterally propagate ransomware via intra-VLAN communication.

\* \* \* \* \*